United States Patent Office 3,830,825

Patented Aug. 20, 1974

3,830,825

ZINC SULF-HYDROXY ALLANTOINATE

Harry W. Margraf, Clayton, Mo., assignee of a fractional part interest to Allen P. Klippel, St. Louis, Mo.

No Drawing. Filed July 23, 1971, Ser. No. 165,736

Int. Cl. C07d *49/32*

U.S. Cl. 260—299 1 Claim

ABSTRACT OF THE DISCLOSURE

Zinc sulf-hydroxy allantoinate has a long-continuing fungicidal property, releasing its zinc ions gradually. It is particularly useful for controlling those fungi which tend to flourish when antibiotics are employed as bactericides.

CROSS REFERENCE TO RELATED APPLICATIONS

Incorporated by reference herein are the disclosures of two applications filed simultaneously herewith, entitled: Anti-Microbial Composition Utilizing Allantoin Carrier, Ser. No. 165,753 filed July 23, 1971.

Physiological Organic Acid Silver Allantoinates, Ser. No. 165,737 filed July 23, 1971.

BACKGROUND OF THE INVENTION

Many compounds of zinc are known to have fungicidal properties; these are used in the treatment of such conditions as "athlete's foot." Zinc is also credited with wound-healing properties. Certain zinc compounds such as zinc oxide and zinc stearate are relatively insoluble in water; others, such as zinc sulfate and zinc chloride, are very highly soluble and tend to burn when applied to an open wound. The use of antibiotics may result in the flourishing of fungi, which grow in the absence of bacteria.

Alantoin is a substance known to have healing and debriding qualities. It is somewhat acidic. While a simple mono-valent metal allantoinate compound may be formed it has not been possible to produce a simple zinc-allantoinate.

SUMMARY OF THE INVENTION

One of the principal objects of the present invention is to provide a zinc composition which is slowly ionized in the presence of moisture at a wound surface, and by its slow release of zinc ions to avoid tissue damage. Another object is to provide a composition which will neutralize allantoin in solution. Still another object is to provide a composition which, when mixed with a silver-containing bacteriocide, will avoid or substantially lessen deterioration of the composition and discoloration of materials in contact.

The present composition is a complex of allantoin and a soluble salt of zinc. Zinc sulfate is used because it is readily available, is non-toxic, and is compatible with preparations of silver salts, with which it may be used as set forth in the related patent applications referred to above.

DETAILED DESCRIPTION

A detailed process for the preparation of zinc sulf-hydroxy allantoinate is as follows:

Into 2 liters of hot distilled water, at 80° C., are introduced 65 gms. of chemically pure allantoin and 242 gms. of zinc sulfate. The zinc sulfate has the formula $ZnSO_4 \cdot 7H_2O$; and 242.0 gm. yield 55 gm. zinc ions and 80 gm. sulfate ions.

The clear solution is filtered to remove any contaminant. 14 gm. $OH^-$ is required; this is supplied by 90 cc. of a concentrated 28% solution of ammonia. Precipitation is continued until the pH of the reaction mixture reaches 7.5. Instead of using ammonia, the hydroxyl ions may be supplied by using equivalent amounts of a mono-valent alkali such as sodium hydroxide or potassium hydroxide.

The precipitate is isolated by filtration under vacuum. The precipitate is washed twice with cold (4° C.) distilled water. Air or vacuum drying yields 165±5 gm. of white crystalline material; this yield represents approximately 95% of the theoretical yield. The crystalline material is then reduced to a fine powder, preferably micronized.

The product has the following structural formula:

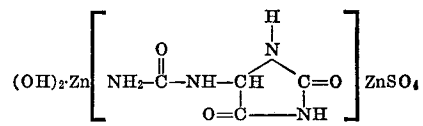

Its molecular weight is 418, the zinc content being 31%.

The present complex is a highly effective fungicidal or fungistatic agent, depending on the concentration used. Its solubility in water at 25° C. is 0.075%; this increases in the presence of products of normal microbial metabolism. Two parts of it will neutralize 98 parts allantoin in aqueous solution. Two parts of the present complex, two parts of the allantoinate of a silver salt, and 96 parts of allantoin form one of the useful bacteriostatic, fungistatic compositions described in the patent application entitled Anti-Microbial Composition Utilizing Allantoin Carrier, above referred to.

The present composition may be applied by spraying onto a wound, as a gel, as a cream, or by painting or dusting onto a surface. Its many utilizations will be apparent to persons skilled in the art.

As used herein, the term "zinc sulf-hydroxy allantoinate" comprises zinc sulf-dihydroxy allantoinate.

I claim:

1. Zinc sulf-hydroxy allantoinate, being a complex having the following structural formula:

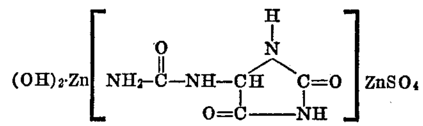

References Cited

UNITED STATES PATENTS

| | | | |
|---|---|---|---|
| 2,336,131 | 12/1943 | Schaffer | 260—299 |
| 2,689,809 | 9/1954 | Fessler | 424—28 X |
| 2,761,867 | 9/1956 | Mecca | 260—299 |

OTHER REFERENCES

Sagarin, *Cosmetics, Science, and Technology*, Interscience (1957), pp. 161–2 and 848.

RICHARD J. GALLAGHER, Primary Examiner

U.S. Cl. X.R.

424—245